(12) United States Patent
Birnkrant

(10) Patent No.: US 11,162,384 B2
(45) Date of Patent: Nov. 2, 2021

(54) NANOCELLULAR FOAM DAMPER

(71) Applicant: United Technologies Corporation, Farmington, CT (US)

(72) Inventor: Michael J. Birnkrant, Kenilworth, NJ (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/792,511

(22) Filed: Feb. 17, 2020

(65) Prior Publication Data

US 2020/0182084 A1    Jun. 11, 2020

Related U.S. Application Data

(62) Division of application No. 15/030,622, filed as application No. PCT/US2014/061448 on Oct. 21, 2014, now Pat. No. 10,563,538.

(Continued)

(51) Int. Cl.
*F01D 25/04* (2006.01)
*F16F 1/37* (2006.01)
(Continued)

(52) U.S. Cl.
CPC ............... *F01D 25/04* (2013.01); *F01D 5/16* (2013.01); *F01D 5/26* (2013.01); *F01D 25/06* (2013.01);
(Continued)

(58) Field of Classification Search
CPC . F01D 25/04; F01D 25/06; F01D 5/16; F01D 5/26; F02C 3/04; F02C 7/24; F05D 2220/323; F05D 2240/20; F05D 2240/35; F05D 2260/96; F05D 2300/10; F05D 2300/20; F05D 2300/612; F16F 15/085;
(Continued)

(56) References Cited

U.S. PATENT DOCUMENTS 5,588,477 A * 12/1996 Sokol ..................... C22C 47/06
164/34
5,592,686 A    1/1997 Third et al.
(Continued)

FOREIGN PATENT DOCUMENTS

EP    1811129    7/2007
WO    9907775    2/1999
(Continued)

OTHER PUBLICATIONS

Luther, E. et al. (2009). Nanostructured metal foams: Synthesis and applications. PowderMet2009, Las Vegas, NV.
(Continued)

*Primary Examiner* — Jesse S Bogue
(74) *Attorney, Agent, or Firm* — Carlson, Gaskey & Olds, P.C.

(57) ABSTRACT

A machine includes a section that defines a target vibrational mode to dampen and a nanocellular foam damper that includes interconnected ligaments in a cellular structure. The interconnected ligaments have an average ligament size defined with respect to a vibrational loss modulus of the nanocellular foam damper and the target vibrational mode. Also disclosed is a method of damping vibration.

18 Claims, 3 Drawing Sheets

Related U.S. Application Data

(60) Provisional application No. 61/894,637, filed on Oct. 23, 2013.

(51) Int. Cl.

| | |
|---|---|
| *F01D 5/16* | (2006.01) |
| *F01D 5/26* | (2006.01) |
| *F01D 25/06* | (2006.01) |
| *F02C 7/24* | (2006.01) |
| *F02C 3/04* | (2006.01) |
| *F16F 15/08* | (2006.01) |

(52) U.S. Cl.
CPC .................. *F02C 3/04* (2013.01); *F02C 7/24* (2013.01); *F16F 1/37* (2013.01); *F16F 15/085* (2013.01); *F05D 2220/323* (2013.01); *F05D 2240/20* (2013.01); *F05D 2240/35* (2013.01); *F05D 2260/96* (2013.01); *F05D 2300/10* (2013.01); *F05D 2300/20* (2013.01); *F05D 2300/612* (2013.01); *F16F 2224/02* (2013.01); *F16F 2224/0225* (2013.01)

(58) Field of Classification Search
CPC ... F16F 1/37; F16F 2224/02; F16F 2224/0225
See application file for complete search history.

(56) References Cited

U.S. PATENT DOCUMENTS

| | | | |
|---|---|---|---|
| 5,848,351 A | 12/1998 | Hoshino et al. | |
| 5,965,249 A * | 10/1999 | Sutton ........................ | C08J 9/40 248/562 |
| 6,719,947 B1 | 4/2004 | Jha et al. | |
| 6,818,081 B2 | 11/2004 | Gash et al. | |
| 6,986,818 B2 | 1/2006 | Tillotson et al. | |
| 6,986,819 B2 | 1/2006 | Tillotson et al. | |
| 8,172,964 B2 | 5/2012 | Gash et al. | |
| 8,226,861 B2 | 7/2012 | Hayes et al. | |
| 8,303,883 B2 | 11/2012 | Landingham et al. | |
| 8,327,973 B2 * | 12/2012 | Parish ................. | B29C 44/5627 181/129 |
| 9,217,084 B2 * | 12/2015 | Schaedler ................. | B32B 5/18 |
| 9,822,264 B2 * | 11/2017 | Birnkrant .............. | F04D 29/023 |
| 9,903,434 B2 | 2/2018 | Erno | |
| 10,071,425 B2 * | 9/2018 | Birnkrant .............. | B22F 3/1125 |
| 2006/0042417 A1 | 3/2006 | Gash et al. | |
| 2007/0142643 A1 | 6/2007 | Huynh et al. | |
| 2009/0226700 A1 | 9/2009 | Ratke et al. | |
| 2009/0317236 A1 * | 12/2009 | Hardwicke ......... | C23C 28/3455 415/119 |
| 2010/0190639 A1 | 7/2010 | Worsley et al. | |
| 2012/0028024 A1 | 2/2012 | Obi et al. | |
| 2012/0064255 A1 | 3/2012 | Wilson et al. | |
| 2012/0196146 A1 | 8/2012 | Rice | |
| 2012/0235073 A1 | 9/2012 | Seo et al. | |
| 2013/0021718 A1 | 1/2013 | Yager et al. | |
| 2013/0264757 A1 | 10/2013 | Rajasekaran et al. | |
| 2015/0133593 A1 * | 5/2015 | Kissell .................. | C08K 3/041 524/496 |

FOREIGN PATENT DOCUMENTS

| | | |
|---|---|---|
| WO | 2006118186 | 11/2006 |
| WO | 2010041014 | 10/2008 |
| WO | 2010009205 | 1/2010 |

OTHER PUBLICATIONS

Schaedler, T.A. et al, (2011). "Ultralight Metallic Microlattices." Science Nov. 18, 2011, vol. 334, pp. 962-965.
International Search Report and the Written Opinion for Application No. PCT/US2014/061448 dated Feb. 4, 2015.
The International Preliminary Report on Patentability for PCT Application No. PCT/US2014/061448, dated May 6, 2016.
European Search Report for European Patent Application No. 14856783 completed Jun. 23, 2017.

* cited by examiner

NANOCELLULAR FOAM DAMPER

CROSS-REFERENCE TO RELATED APPLICATION

The present disclosure is a divisional of U.S. patent application Ser. No. 15/030,622 filed Apr. 20, 2016, which is a National Stage Application of International Application No. PCT/US2014/061448 filed Oct. 21, 2014, which claims priority to U.S. Provisional Application No. 61/894,637, filed Oct. 23, 2013.

BACKGROUND

This disclosure relates to vibration dampers. Rotating components, friction between components, meshing of gear teeth, and other mechanical motion can cause vibrations in engines, motors or other mechanical devices. The vibration can produce noise. Vibration damping materials can be used to attenuate the vibration, and thus reduce noise. Elastomers and engineering polymers have good properties for vibration damping but have relatively low maximum temperature capability and are therefore not suitable in high temperature applications, such as in gas turbine engines.

SUMMARY

A method of damping vibration in a machine according to an example of the present disclosure includes identifying a target vibrational mode to dampen, and tuning a nanocellular foam damper according to the target vibrational mode by selecting ligament properties of interconnected ligaments of the nanocellular foam damper with respect to a loss modulus and tan δ (tan delta) of the nanocellular foam damper and the target vibrational mode.

In a further embodiment of any of the foregoing embodiments, the metal nanocellular foam damper includes a metal and at least one ceramic filler material as a coating or mixture.

In a further embodiment of any of the foregoing embodiments, the interconnected ligaments include a material selected from the group consisting of metals, ceramic materials, and combinations thereof.

In a further embodiment of any of the foregoing embodiments, the ligament size is a width dimension, and the width dimension is less than 100 nanometers.

In a further embodiment of any of the foregoing embodiments, the interconnected ligaments include at least one metal.

In a further embodiment of any of the foregoing embodiments, the at least one metal is selected from the group consisting of manganese, titanium, tungsten, vanadium, niobium, hafnium, tantalum, rhenium, ruthenium, iridium, palladium, platinum, zirconium, cobalt, yttrium, copper, molybdenum, aluminum, chromium, iron, nickel, and combinations thereof.

In a further embodiment of any of the foregoing embodiments, the at least one metal is selected from the group consisting of hafnium, tantalum, rhenium, ruthenium, iridium, palladium, platinum, zirconium, cobalt, yttrium, nickel, and combinations thereof.

In a further embodiment of any of the foregoing embodiments, the interconnected ligaments include at least one ceramic material is a silicon carbide, silicon nitride or metal silicide.

In a further embodiment of any of the foregoing embodiments, the nanocellular foam damper is fully enclosed in a solid shell.

The method as recited in claim 9, wherein the interconnected ligaments and the solid shell are metals.

In a further embodiment of any of the foregoing embodiments, the metals are different.

In a further embodiment of any of the foregoing embodiments, the nanocellular foam damper is a uniform thickness coating.

In a further embodiment of any of the foregoing embodiments, the nanocellular foam damper has an interconnected, open-cell porosity.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
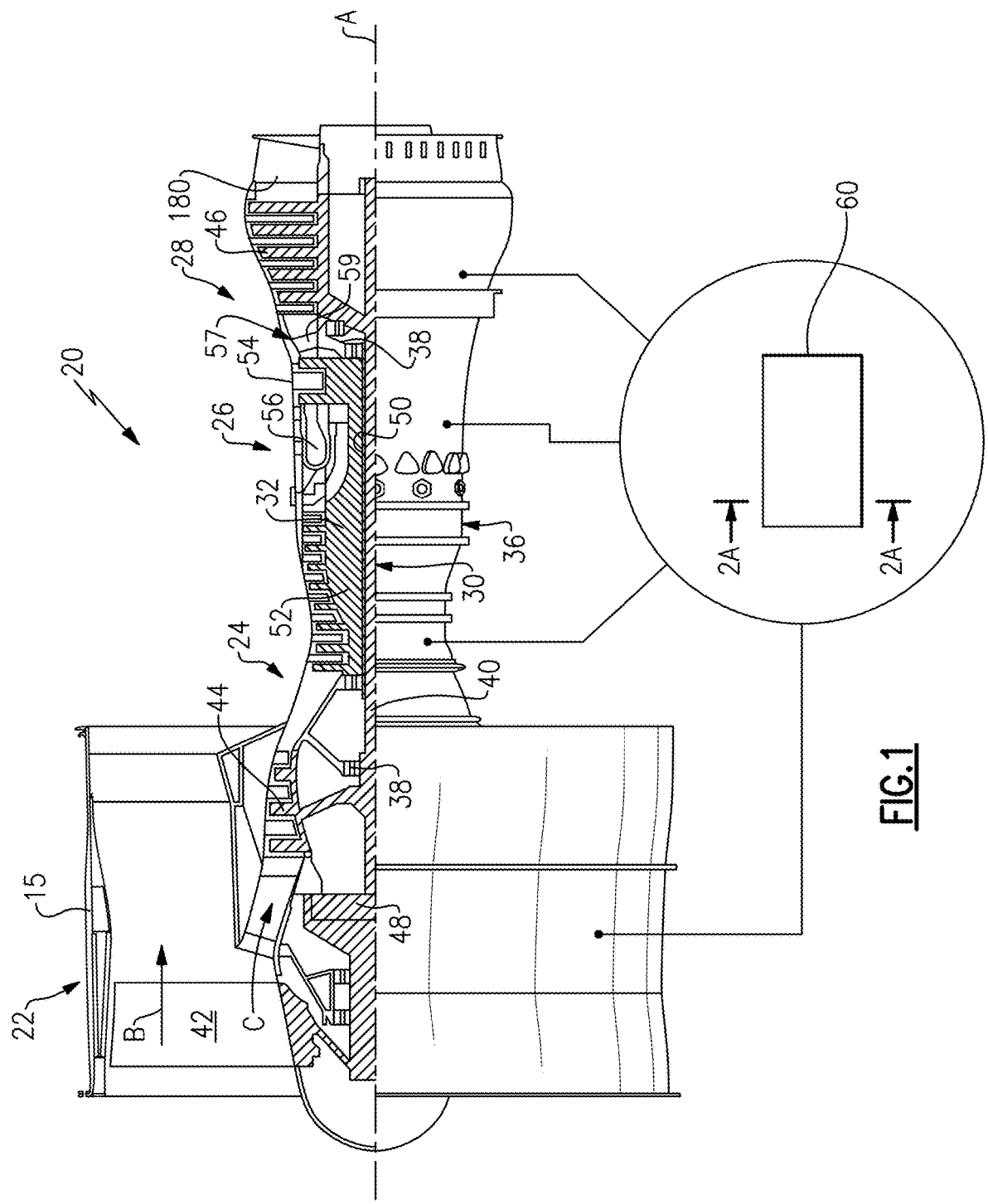
FIG. 1 illustrates an example gas turbine engine.

FIG. 1 schematically illustrates an example machine, which in this example is a gas turbine engine 20. It is to be understood that the examples herein are not limited to gas turbine engines and that other types of engines and machines may benefit from the disclosed nanocellular foam.

The gas turbine engine 20 is disclosed herein as a two-spool turbofan that incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it is to be understood that the concepts described herein are not limited to use with two-spool turbofans, and the teachings can be applied to other types of turbine engines, including three-spool architectures and ground-based engines.

The engine 20 includes a first spool 30 and a second spool 32 mounted for rotation about an engine central axis A relative to an engine static structure 36 via several bearing systems, shown at 38. It is to be understood that various bearing systems at various locations may alternatively or additionally be provided and the location of bearing systems may be varied as appropriate to the application.

The first spool 30 includes an inner shaft 40 that interconnects a fan 42, a first compressor 44 and a first turbine 46. The inner shaft 40 is connected to the fan 42 through a speed change mechanism, which in this example is a gear system 48, to drive the fan 42 at a lower speed than the first spool 30. The second spool 32 includes an outer shaft 50 that interconnects a second compressor 52 and second turbine 54.

The example first turbine 46 has a pressure ratio that is greater than about 5. The pressure ratio of the example first turbine 46 is measured prior to an inlet of the first turbine 46 as related to the pressure measured at the outlet of the first turbine 46 prior to an exhaust nozzle.

A combustor 56 is arranged between the second compressor 52 and the second turbine 54. A mid-turbine frame 57 of the engine static structure 36 is arranged between the second turbine 54 and the first turbine 46. The mid-turbine frame 57 further supports bearing system 38 in the turbine section 28. The inner shaft 40 and the outer shaft 50 are concentric and rotate via, for example, bearing systems 38 about the engine central axis A which is collinear with their longitudinal axes.

The core airflow is compressed by the first compressor 44 then the second compressor 52, mixed and burned with fuel in the combustor 56, then expanded over the second turbine 54 and first turbine 46. The mid-turbine frame 57 includes airfoils 59 which are in the core airflow path C. The turbines 46, 54 rotationally drive the respective first spool 30 and second spool 32 in response to the expansion. It will be appreciated that each of the positions of the fan section 22, compressor section 24, combustor section 26, turbine section 28, and gear system 48 can be varied. For example, gear system 48 may be located aft of combustor section 26 or even aft of turbine section 28, and fan section 22 may be positioned forward or aft of the location of gear system 48.

The engine 20 in one example is a high-bypass geared engine. In a further example, the engine 20 has a bypass ratio that is greater than about six (6), with an example embodiment being greater than about ten (10), the gear system 48 is an epicyclic gear train, such as a planet or star gear system, with a gear reduction ratio of greater than about 2.3, and the first turbine 46 has a pressure ratio that is greater than about five (5). In one disclosed embodiment, the bypass ratio is greater than about ten (10:1), the fan diameter is significantly larger than that of the low pressure compressor 44, and the first turbine 46 has a pressure ratio that is greater than about five (5). The first turbine 46 pressure ratio is pressure measured prior to inlet of low pressure turbine 46 as related to the pressure at the outlet of the first turbine 46 prior to an exhaust nozzle. The gear system 48 can be an epicycle gear train, such as a planet or star gear system, with a gear reduction ratio of greater than about 2.3:1. It is to be understood, however, that the above parameters are only exemplary and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

The fan 42, in one non-limiting embodiment, includes less than about twenty-six fan blades. In another non-limiting embodiment, the fan section 22 includes less than about twenty fan blades. Moreover, in a further example, the first turbine 46 includes no more than about six turbine rotors. In another non-limiting example, the first turbine 46 includes about three turbine rotors. A ratio between the number of fan blades and the number of low pressure turbine rotors is between about 3.3 and about 8.6. The example first turbine 46 provides the driving power to rotate the fan section 22 and therefore the relationship between the number of turbine rotors 34 in the first turbine 46 and the number of blades in the fan section 22 discloses an example gas turbine engine 20 with increased power transfer efficiency.

The engine 20 can vibrate and generate sound. Where there is a desire to reduce the decibel level of the sound, or reduce the vibrations for other reasons, one or more of the fan section 22, the compressor section 24, the combustor section 26 and the turbine section 28 can include a nanocellular foam damper 60, represented schematically in FIG. 1. Additionally, as will be described, the nanocellular foam damper 60 can provide vibration attenuation at temperatures of greater than 300° C. and thus can be used in or along the core flow path C of the engine 20. At least portions of the core flow path C are operable at temperatures of greater than 300° C., which would exceed the maximum operating temperatures of polymer-based dampers. However, the nanocellular foam damper 60 can be fabricated from metal, ceramic material, or combinations thereof to provide the nanocellular foam damper 60 with a maximum operating temperature of greater than 300° C.

The nanocellular foam damper 60 can be tuned in a design stage according to a target vibrational mode to dampen. This can be achieved using several different methods during synthesis and in application by thermal treatment or by post processing. An example of each respectively can be changing the starting material composition, programmed temperature profile or applying a static strain on the material. The ability to change material impacts the properties of the cellular foam's ligaments. The static strain or thermal treatment influences the pore dimensions of the nanocellular foam. Synthesis, heat treatment and post processing modify the vibrational mode that is dampened. In one example, the nanocellular foam's pore size is tuned by heat treating at different temperatures, which results in tuning the peak vibrational mode dampened. In this regard, the nanocellular foam damper 60 is designed with respect to mechanical properties and the target vibrational mode to attenuate vibration in the engine 20. Vibrational dampening can be represented by the measurable mechanical properties of loss modulus and tan δ (tan delta), which is a manifestation of viscoelastic effects.

Figure 2A:
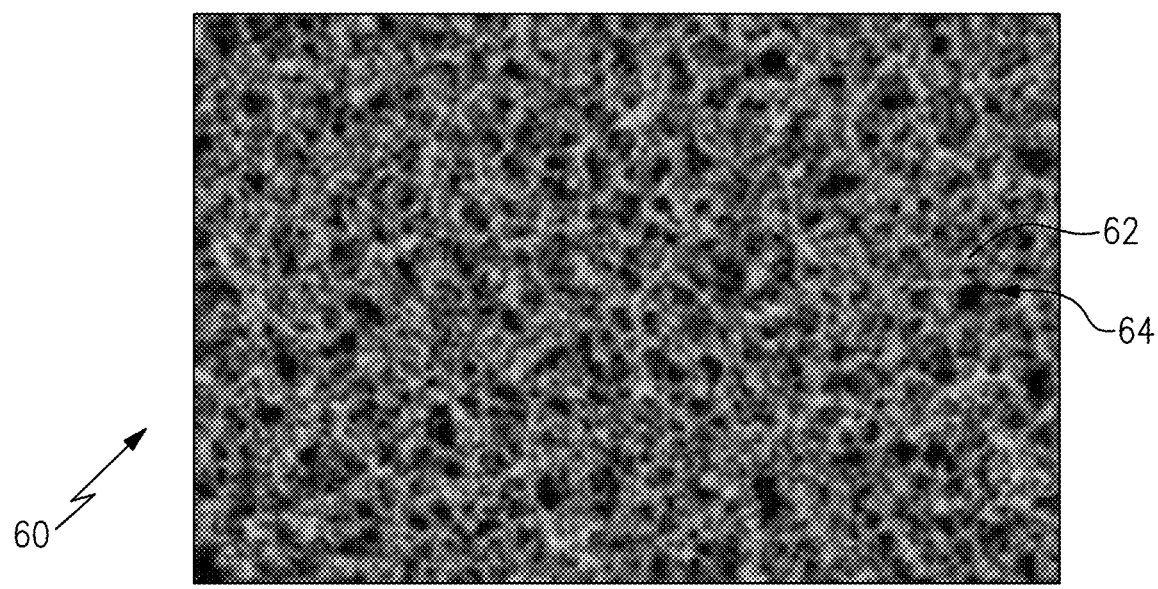
FIG. 2A is a micrograph of a representative cross-section of a nanocellular foam damper.
Figure 2B:
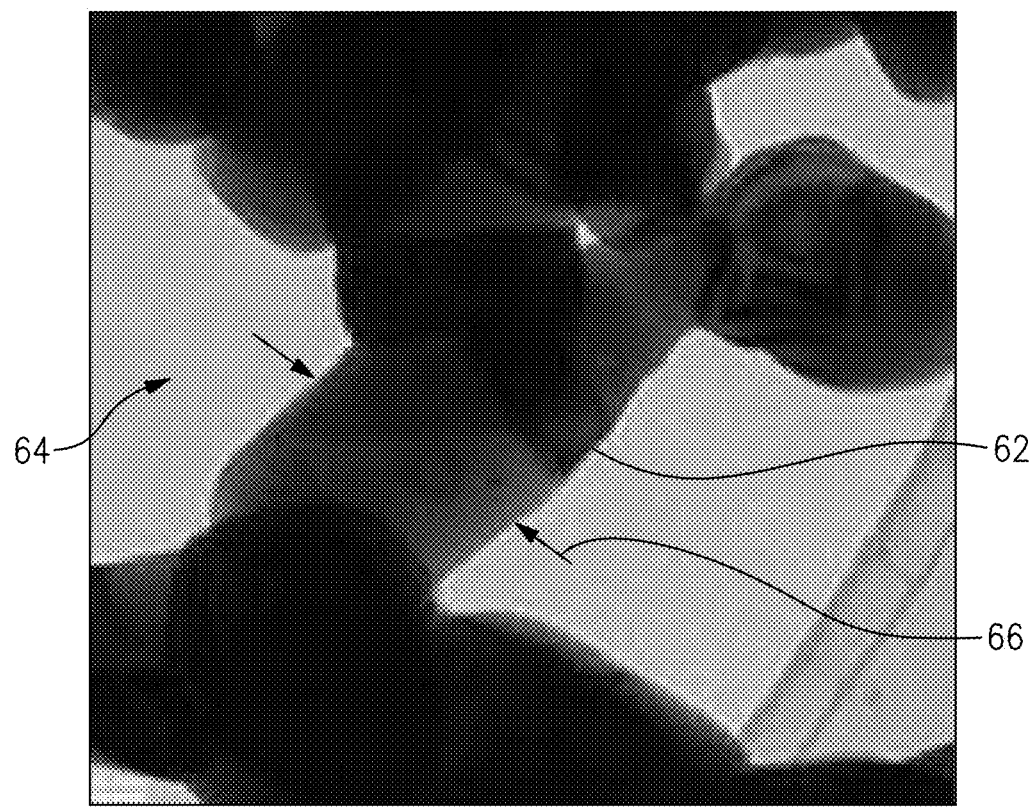
FIG. 2B is a higher magnification micrograph of a portion of the nanocellular foam damper of FIG. 2A.

FIG. 2A is a micrograph of a representative cross-section of a portion of the nanocellular foam damper 60, and FIG. 2B is a higher magnification micrograph of a portion of the nanocellular foam damper 60. The nanocellular foam damper 60 includes interconnected ligaments 62 in a cellular structure 64. For example, the cellular structure 64 has an interconnected, open-cell porosity.

The interconnected ligaments 62 have an average ligament size, represented at 66. In one example the average ligament size 66 is the width dimension of the interconnected ligaments 62. In a further example, the width dimension is less than 1000 nanometers. As used herein, the term "nanocellular" or variations thereof refer to a ligament size, or pore size, of less than 1000 nanometers. In further examples, the width dimension or pore size is less than 500 nanometers or even less than 100 nanometers.

In a macrosize range, a given porous material behaves close to its solid form and thus the porous material and the solid material have equivalent loss moduli. However, in a nanosize range, the loss modulus of a given material increases in comparison to its solid form. Thus, while metals such as nickel may not be good dampers in solid form, they can be good dampers in the cellular structure 64 with nanosized interconnected ligaments 62. In one non-limiting example to demonstrate the difference, the tan δ of two nickel-based alloys (Haynes 242 and Inconel 718) in solid form is 0.0056 or less over a range of vibrational modes, while the tan δ of a nickel nanocellular foam is approximately 0.4.

The nanosize of the interconnected ligaments 62 permits the interconnected ligaments 62 to move in response to vibrations. For example, in a "zero vibration" state, the interconnected ligaments 62 are in an unflexed position. Upon vibration, at least a portion of the interconnected ligaments 62 can cyclically flex and unflex (i.e., buckle and unbuckle). The flexing and unflexing converts mechanical energy eventually to thermal energy and thus reduces (i.e. attenuates) the energy of the mechanical vibration. The movement by the interconnected ligaments 62 is not necessarily limited to flexing/unflexing, and twisting or other types of movement may also control or contribute to the conversion of mechanical energy to thermal energy.

The cellular structure 64 of the nanocellular foam damper 60 can be fabricated using processing techniques such as combustion synthesis, metal de-alloying, and sol-gel synthesis. In one example, a nanocellular foam was synthesized from nickel nano-materials. The nano-materials, as an example, can be nanoparticles, nanowires, nanoplatlets or a combination thereof, and can be processed using a sol-gel gel technique. The nano-materials in the nanocellular foam can be further processed to form interconnected ligaments by heat treatment.

The cellular structure 64 is formed of one or more high temperature-resistant materials. For example, the high temperature material is a monolithic metal, a multi-metal, a monolithic ceramic material, a ceramic-containing material, or combinations thereof. The metal or metals can be manganese, titanium, tungsten, vanadium, niobium, hafnium, tantalum, rhenium, ruthenium, iridium, palladium, platinum, zirconium, cobalt, yttrium, copper, molybdenum, aluminum, chromium, iron, nickel, or combinations thereof. Other elements may be synthesized into nanocellular foams such as silicon, and carbon. In addition, an element can be added to the metal foam or mixture of metals to enhance specific properties, such as boron is added to nickel aluminide. The porosity of the nanocellular foam may be from about 5 percent to about 95 percent. In addition, the nanocellular foams have submicron ligament diameters. In one example, monolithic nickel is used in the engine 20 because of its good temperature and environmental resistance.

Ceramic nanocellular materials may also be used to dampen vibrations. An example would be a ceramic nanocellular foam composed silicon carbide, silicon nitride, nickel silicide or aluminum silicide, or combinations thereof. A ceramic filler material(s) can also be incorporated into the metal nanocellular foam as a coating or mixture. As examples, oxides, carbon, borides, carbides, silicides and nitrides of the metals listed above or combinations thereof can be incorporated into the nanocellular material as a coating or mixture.

Figure 3:
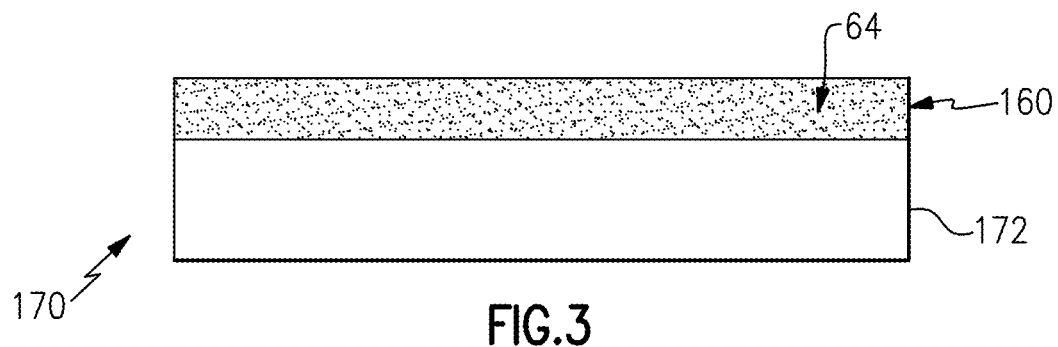
FIG. 3 is an example of a nanocellular foam damper incorporated into an article.

FIG. 3 shows a further example of a nanocellular foam damper 160 incorporated into an article 170. In this disclosure, like reference numerals designate like elements where appropriate and reference numerals with the addition of one-hundred or multiples thereof designate modified elements that are understood to incorporate the same features and benefits of the corresponding elements. In this example, the nanocellular foam damper 160 is a uniform thickness coating disposed on a substrate 172. Although the geometry of the substrate 172 is shown generically, it is to be understood that the substrate 172 can be a component in the engine 20 that will benefit from the vibration attenuation provided by the nanocellular foam damper 160. For example, portions of the combustor 56, an exit guide vane 180 (FIG. 1), and/or other components in the engine 20 could include the nanocellular foam damper 160. In particular, components such as the combustor 56 and the exit guide vane 180 are within the core flow path C of the engine 20 and can therefore be exposed to temperatures exceeding 300° C. As discussed above, the nanocellular foam damper 160 is formed of a high-temperature resistant material and can therefore provide damping at such temperatures.

Figure 4:
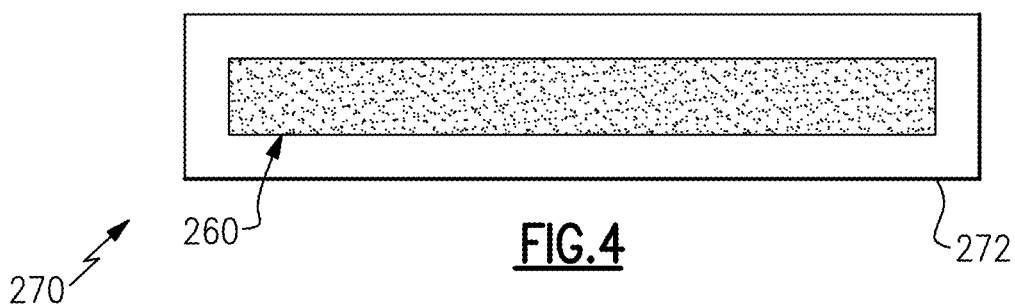
FIG. 4 is an example of a nanocellular foam damper incorporated into another article.

FIG. 4 shows a further example of a nanocellular foam damper 260 incorporated into an article 270. In this example, the nanocellular foam damper 260 is fully enclosed in a solid shell 272. For example, the solid shell is a solid skin disposed around the nanocellular foam damper 260 that protects the nanocellular foam damper 260 from mechanical damage, such as abrasion. In one example, the solid shell 272 is a metal or metal alloy. The metal can be the same or different than the metal or metals, if selected, of the nanocellular foam damper 260. In one example, the solid shell 272 is a different metal or metal alloy, to thermally, mechanically and/or environmentally protect the nanocellular foam damper 260.

The nanocellular foam damper 260 can be bonded to the solid shell 272 to form the article 270 as a unitary piece. The bonding can include brazing, diffusion bonding, or transient liquid phase bonding, but is not limited to these bonding techniques. A bond can also be formed in fabrication during fabrication of the nanocellular foam damper 260 and/or during fabrication of the solid shell around the nanocellular foam damper 260.

Figure 5:
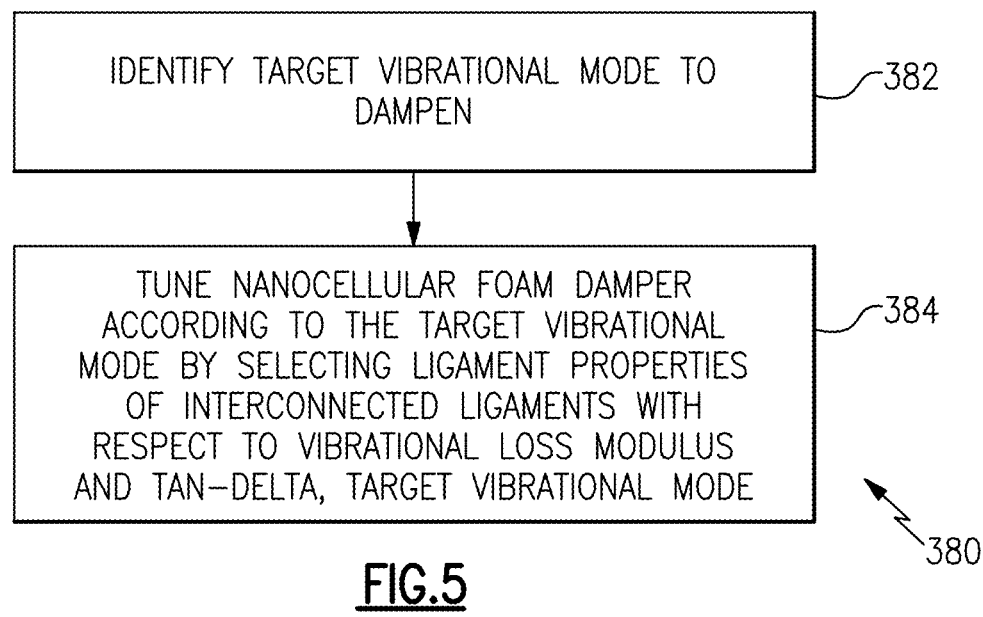
FIG. 5 is an example method of damping vibration in a gas turbine engine.

FIG. 5 illustrates an example method 380 of damping vibration in a gas turbine engine. The method includes identifying a target vibrational mode to dampen at step 382 and, at step 384, tuning the nanocellular foam damper 60/160/260 according to the target vibrational mode by selecting composition and size of ligament 66 of interconnected ligaments 62 of the nanocellular foam damper 60/160/260 with respect to the vibrational loss modulus and tan delta of the nanocellular foam damper and the target vibrational mode. For example, a computer analysis of a section of the engine 20 may be used to identify the target vibrational mode. A vibrational loss modulus suited to attenuate the target vibrational mode can then be identified. For example, the selection can be identified from experimental data of vibrational loss moduli versus vibrational modes. The nanocellular foam damper 60/160/260 can then be fabricated to obtain the identified loss modulus through selection of an average ligament size 66 of the interconnected ligaments 62 for a given material of the nanocellular foam damper 60/160/260. For example, the selection can be identified from experimental data of average ligament size 66 versus loss modulus and tan delta.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of damping vibration in a machine, the method comprising:
   tuning a nanocellular foam damper for attenuation of a target vibrational mode by selecting a loss modulus of the nanocellular foam damper that attenuates the target vibrational mode, selecting a ligament size for interconnected ligaments of the nanocellular foam damper that provides the selected loss modulus, and then fabricating the nanocellular foam damper with the selected ligament size, the ligament size being taken in a width dimension of the respective interconnected ligaments.

2. The method as recited in claim 1, wherein the nanocellular foam damper includes a metal and at least one ceramic filler material as a coating or mixture.

3. The method as recited in claim 1, wherein the interconnected ligaments include a material selected from the group consisting of metals, ceramic materials, and combinations thereof.

4. The method as recited in claim 1, wherein the ligament size is a width dimension, and the width dimension is less than 100 nanometers.

5. The method as recited in claim 1, wherein the interconnected ligaments include at least one metal.

6. The method as recited in claim 5, wherein the at least one metal is selected from the group consisting of manganese, titanium, tungsten, vanadium, niobium, hafnium, tantalum, rhenium, ruthenium, iridium, palladium, platinum, zirconium, cobalt, yttrium, copper, molybdenum, aluminum, chromium, iron, nickel, and combinations thereof.

7. The method as recited in claim 5, wherein the at least one metal is selected from the group consisting of hafnium, tantalum, rhenium, ruthenium, iridium, palladium, platinum, zirconium, cobalt, yttrium, nickel, and combinations thereof.

8. The method as recited in claim 1, wherein the interconnected ligaments include at least one ceramic material is a silicon carbide, silicon nitride or metal silicide.

9. The method as recited in claim 1, wherein the nanocellular foam damper is fully enclosed in a solid shell.

10. The method as recited in claim 9, wherein the interconnected ligaments and the solid shell are metals.

11. The method as recited in claim 10, wherein the metals are different.

12. The method as recited in claim 1, wherein the nanocellular foam damper is a uniform thickness coating.

13. The method as recited in claim 1, wherein the nanocellular foam damper has an interconnected, open-cell porosity.

14. The method as recited in claim 1, wherein the interconnected ligaments are formed of a metal alloy including at least one of cobalt or nickel.

15. The method as recited in claim 1, wherein the interconnected ligaments are formed of a nickel-based alloy.

16. The method as recited in claim 1, wherein the interconnected ligaments are formed of monolithic nickel.

17. The method as recited in claim 1, wherein the nanocellular foam damper includes a ceramic filler material selected from oxides, borides, carbides, silicides, and nitrides.

18. The method as recited in claim 1, wherein the nanocellular foam damper includes a ceramic filler material selected from metal borides.

* * * * *